(12) United States Patent
Johnson et al.

(10) Patent No.: US 8,534,135 B2
(45) Date of Patent: Sep. 17, 2013

(54) LOCAL STRESS MEASUREMENT

(75) Inventors: Timothy A Johnson, Tigard, OR (US); Michael J Darwin, Portland, OR (US)

(73) Assignee: Nanometrics Incorporated, Milpitas, CA (US)

( * ) Notice: Subject to any disclaimer, the term of this patent is extended or adjusted under 35 U.S.C. 154(b) by 220 days.

(21) Appl. No.: 13/093,737

(22) Filed: Apr. 25, 2011

(65) Prior Publication Data

US 2011/0265578 A1 Nov. 3, 2011

Related U.S. Application Data

(60) Provisional application No. 61/330,215, filed on Apr. 30, 2010.

(51) Int. Cl.
*G01L 1/24* (2006.01)

(52) U.S. Cl.
USPC .................................................. 73/800; 73/760

(58) Field of Classification Search
USPC ........................................................ 73/760, 800
See application file for complete search history.

(56) References Cited

U.S. PATENT DOCUMENTS

| | | | |
|---|---|---|---|
| 5,398,113 A | 3/1995 | de Groot | |
| 5,739,906 A * | 4/1998 | Evans et al. | 356/503 |
| 6,543,288 B1 * | 4/2003 | Blouin et al. | 73/643 |
| 6,545,763 B1 | 4/2003 | Kim et al. | |
| 6,762,846 B1 | 7/2004 | Poris | |
| 7,061,623 B2 | 6/2006 | Davidson | |
| 7,301,623 B1 * | 11/2007 | Madsen et al. | 356/244 |
| 7,966,135 B2 * | 6/2011 | Rosakis et al. | 702/42 |
| 2002/0066310 A1 | 6/2002 | Jachim | |
| 2007/0017296 A1 | 1/2007 | Huang et al. | |
| 2007/0103659 A1 | 5/2007 | Yoshitake et al. | |
| 2007/0180919 A1 * | 8/2007 | Rosakis et al. | 73/760 |
| 2011/0027723 A1 * | 2/2011 | Suzuki et al. | 430/325 |

OTHER PUBLICATIONS

International Search Report and Written Opinion mailed on Jul. 22, 2011 for International Application No. PCT/US2011/034004 filed on Apr. 26, 2011, twelve pages.
Blech, Blech, and Finot, "Determination of thin-film stresses on round substrates" J. Appl. Phys. 97, 113525, pp. 1-7, (2005).
Chang, Akilian, and Schattenburg, "Describing isotropic and anisotropic out-of-plane deformations in thin cubic materials by use of Zernike polynomials", Applied Optics, vol. 45, No. 3, pp. 432-437 (2006).
De Groot and Colonna De Lega, "Transparent film profiling and analysis by interference microscopy" Interferometry XIV: Applications, Proc. of SPIE, vol. 706401, pp. 1-6 (2008).

(Continued)

*Primary Examiner* — Max Noori
(74) *Attorney, Agent, or Firm* — Silicon Valley Patent Group LLP

(57) ABSTRACT

An optical metrology device determines the local stress in a film on a substrate. The metrology device maps the thickness of the substrate prior to processing. After processing, the metrology device determines the surface curvature of the substrate caused by the processing and maps the thickness of a film on the top surface after of the substrate after processing. The surface curvature of the substrate may be determined as basis functions. The local stress in the film is then determined using the mapped thickness of the substrate, the determined surface curvature, and the mapped thickness of the film. The local stress may be determined using Stoney's equation that is corrected for non-uniform substrate curvature, non-uniform film thickness, and non-uniform substrate thickness.

38 Claims, 6 Drawing Sheets

(56) References Cited

OTHER PUBLICATIONS

Feng, Huang, and Rosakis, "On the Stoney Formula for a Thin Film/Substrate System With Nonuniform Substrate Thickness", J. App. Mech. vol. 74, pp. 1276-1281 (2007).

Ngo, Feng, Huang, Rosakis and Brown, "Thin film/substrate systems featuring arbitrary film thickness and misfit strain distributions: Part I. Analysis for obtaining film stress from nonlocal curvature information", Int. J. Solids Stud. 44, pp. 1745-1754 (2007).

Ngo, Huang, Rosakis and Feng, "Spatially non-uniform, isotropic misfit strain in thin films bonded on plate substrates: the relation between non-uniform stresses and system curvatures", Thin Solid Films 515, pp. 2220-2229 (2006).

* cited by examiner

LOCAL STRESS MEASUREMENT

CROSS-REFERENCE TO RELATED APPLICATIONS

This application claims the benefit of Provisional Application No. 61/330,215, filed Apr. 30, 2010, which is incorporated by reference herein in its entirety.

BACKGROUND

Flat substrates, such as semiconductor substrates, are stressed during certain processing steps, e.g., depositing or etching thin films. Stress in deposited layers can warp the substrate, which can adversely affect subsequent process steps, device performance, reliability and line-width control. Thus, it is desirable to measure the radius of curvature of a substrate as well as measure the stress on a substrate that is associated with a processing step.

There are many measurement tools available for measurement of the radius of curvature and analysis of the stress associated with certain processing steps on substrates. Most of the available tools for the semiconductor industry use a laser displacement sensor to measure the radius of curvature and to monitor the change in radius of curvature of the substrate before and after the processing step. Generally, radius of curvature is used to describe the bow of the substrate over a larger scale, e.g., the diameter of the substrate. Typical metrology devices, however, do not measure the local topography, and thus, provide only a global Bow/Stress measurement.

SUMMARY

An optical metrology device determines the local stress in a film on a substrate in accordance with an embodiment of the present invention. The metrology device, which may be, e.g., a white light interferometer, maps the thickness of a substrate prior to processing. After processing, the metrology device determines the surface curvature of the substrate caused by the processing and maps the thickness of a film on the top surface of the substrate after processing. The surface curvature of the substrate may be parameterized over a set of basis functions. The local stress in the film is then determined using the mapped thickness of the substrate, the determined surface curvature, and the mapped thickness of the film. In one embodiment, the local stress may be determined using a version of Stoney's equation that is corrected for non-uniform substrate curvature, non-uniform film thickness, and non-uniform substrate thickness.

DETAILED DESCRIPTION

Figure 1:
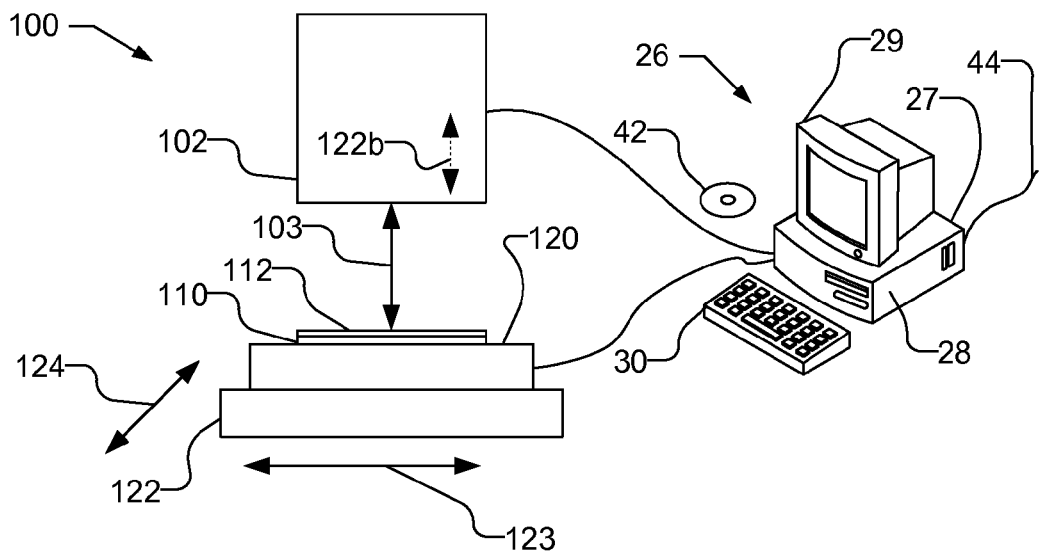
FIG. 1 shows a schematic view of a metrology device that may be used to determine localized stress in a substrate by characterizing the substrate warp and bow, substrate thickness variation, and film thickness variation.

FIG. 1 shows a schematic view of a metrology device 100 that may be used to determine localized stress in a patterned or unpatterned substrate 110 by characterizing the substrate warp and bow, substrate thickness variation, and film thickness variation. The metrology device 100 includes chuck 120 mounted on a stage 122. The stage 122 is capable of horizontal motion in either Cartesian (i.e., X and Y) coordinates, as indicated by arrows 123 and 124, or Polar (i.e., R and θ) coordinates or some combination of the two. The stage may also be capable of vertical motion.

Metrology device 100 includes an optical head 102 that is coupled to a computer 26, such as a workstation, a personal computer, central processing unit or other adequate computer system, or multiple systems. If desired, multiple optical heads, i.e., different metrology devices, may be combined in the same metrology device 100. The computer 26 may control the movement of the stage 122 and optical head 102, as well as control the operation of the chuck 120. In one embodiment, the chuck 120 may be held stationary while the optics move relative to the substrate 110 or both may move relative to the other. For example, the optical head 102 or a portion of the optical head 102, e.g., an objective lens, may be movable in the vertical direction, as indicated by arrow 122b.

Figure 2:
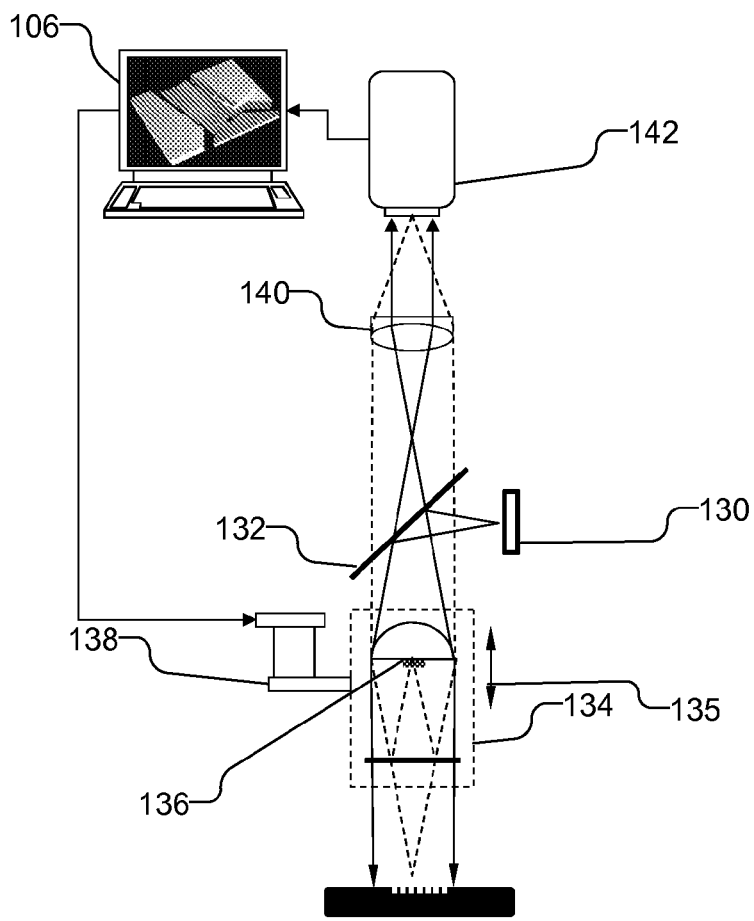
FIG. 2 illustrates a white light interferometer, which may be used as the metrology device of FIG. 1.

In one embodiment, the optical head 102 may be white light interferometer 102 (shown in FIG. 2), which produces two measurement beams 103. Interferometer 102 includes a broadband light source 130 and a beam splitter 132. Light from the beam splitter 132 is reflected towards an interference objective 134, which includes a reference minor 136. The interference objective 134 is coupled to an actuator 138, which is controlled by computer 26, to adjust the vertical position of the interference objective 134. The interference objective produces a beam 103 that is incident on and reflects from the substrate 110, passes back through the interference objective 134 and beam splitter 132 and focused by imaging lens 140 onto detector 142, which is coupled to the computer 26.

Figure 3A:
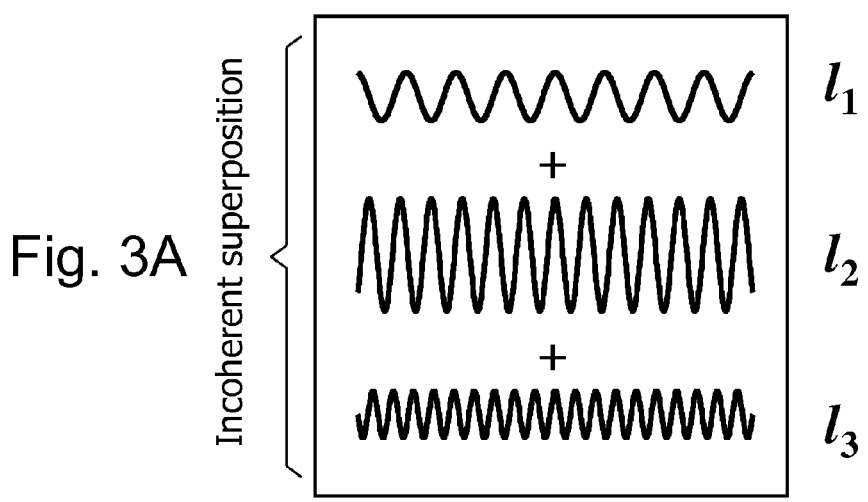
FIGS. 3A and 3B illustrate superposition of multiple wavelength interference patterns to produce white light interference.
Figure 3B:
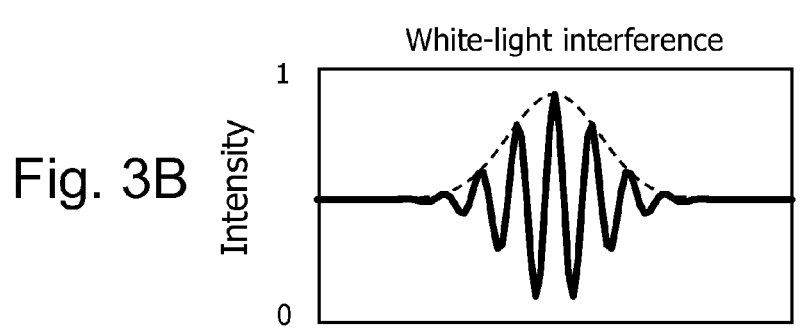

In operation, the white light interferometer 102 scans the interference objective 134, as indicated by the arrow 135 collecting interference patterns in the image plane. White light interference is the superposition of multiple wavelength interference patterns, as illustrated in FIGS. 3A and 3B. FIG.

Figure 4A:
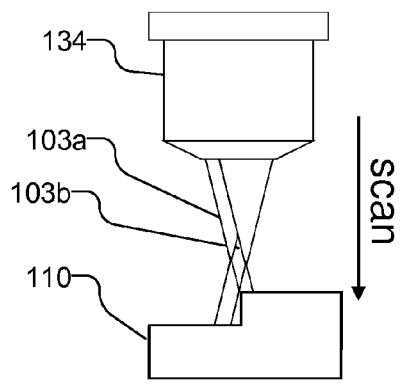
FIG. 4A illustrates measuring multiple locations on the substrate.
Figure 4B:
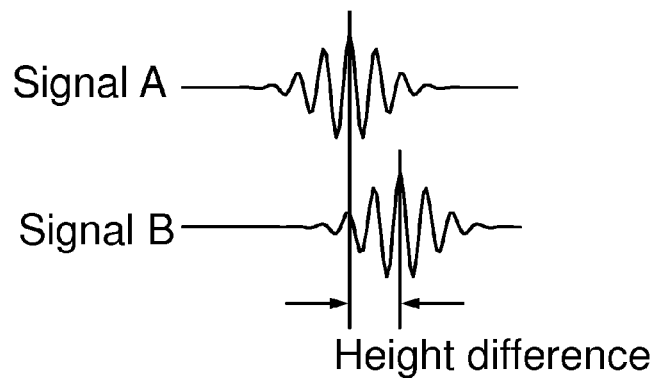
FIG. 4B illustrates determining a height difference based on detected intensity signals for different pixels.

3B illustrates the measured intensity of the light for a single pixel in detector 142, where the vertical axis represents intensity and the horizontal axis represents the Z position (i.e., height) from the surface of the substrate 110. When the peaks for the wavelengths are equal and all patterns have a common phase, the surface is detected (L=0). By measuring multiple locations in the illumination spot as illustrated by beamlets 103a and 103b in FIG. 4A, i.e., by detecting intensity signals for different pixels in detector 142, the height difference at the different locations can be determined, as illustrated in FIG. 4B. By scanning the interference objective 134 parallel to the surface of the substrate 110, the topography of the surface of the substrate 110 can be mapped as a three-dimensional image. White light interferometer 102 and its general operation are described in more detail in U.S. Pat. No. 5,398,113, which is incorporated herein by reference in its entirety.

While a white light interferometer 102 is described herein as providing the film thickness, substrate thickness, and surface curvature to determine localized stress, it should be understood that other types of metrology devices that alone or in combination that can characterize the substrate bow, substrate thickness variation, and film thickness variation may be used to determine localized stress as described herein. For example, metrology devices, such as confocal microscopes, reflectometers, ellipsometers, or other interferometers, including shear interferometers, may be used alone or in some combination within metrology device 100.

Figure 5:
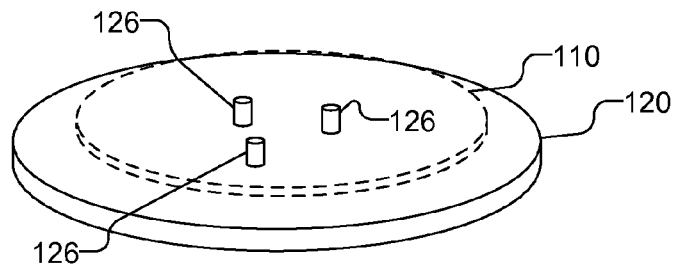
FIG. 5 is a perspective view of stress-free chuck with three retractable lift pins that support the substrate.
Figure 6:
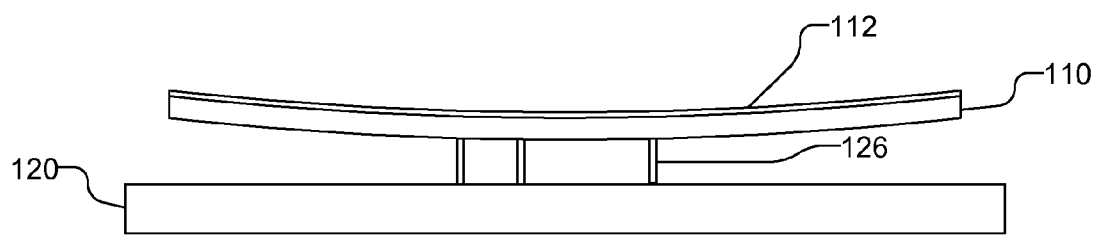
FIG. 6 is a side view of chuck and lift pins supporting the substrate.
Figure 7:
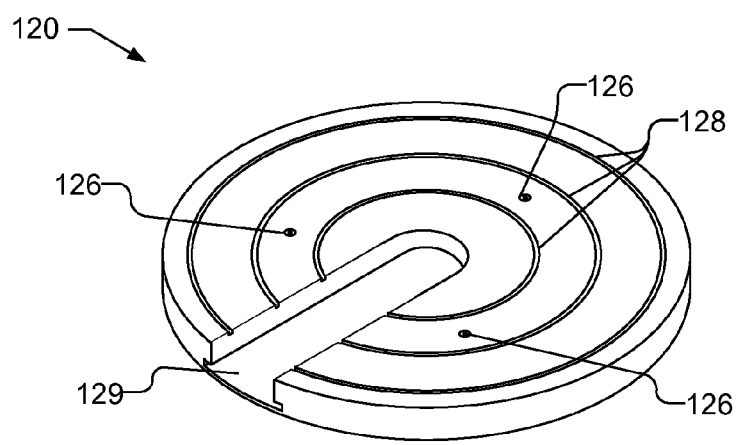
FIG. 7 is a perspective view of a chuck that includes channels through which a vacuum may be applied to the back side of a substrate and shows the lift pins retracted.

To determine the localized stress in a thin film deposited on substrate 110, the metrology device 100 characterizes the substrate warp and bow. In order to characterize substrate warp and bow, the substrate 110 is permitted to deform under gravity and internal stress using a stress-free chuck 120. FIG. 5 is a perspective view of stress-free chuck 120 with three retractable lift pins 126 that support the substrate 110 (illustrated with broken lines). Lift pins 126 lift a substrate off the top surface of the chuck 120 and support the substrate at a minimum of contact points to permit an accurate measurement of curvature of the substrate. FIG. 6 is a side view of chuck 120 and lift pins 126 supporting the substrate 110, which is illustrated with a film 112. The bowing of substrate 110 is shown greatly exaggerated in FIG. 6 for illustrative purposes. As illustrated in FIG. 7, the chuck 120 includes a plurality of channels 128 through which a vacuum may be applied to the back side of a substrate resting on the surface of the chuck. The vacuum ensures that the substrate lies flat during a thickness measurement. If desired, chuck 120 may use other means for holding the substrate 110 flat during thickness measurements, such as an electrostatic force, which is well known in the art. FIG. 7 illustrates the lift pins 126 retracted. If desired, chuck 120 may include a slot 129 that allows access for a paddle (not shown) to place and retrieve a substrate on the top surface of the chuck 120. Alternatively, the lift pins 126 may be used for loading and unloading the substrate.

Referring back to FIG. 1, the computer 26 controls the stage 122 and optical head 102. The computer 26 also collects and analyzes the data from the optical head 102 to determine the substrate warp and bow, substrate thickness variation, and film thickness variation which is used to determine localized stress in a deposited thin film. A computer 26 is preferably included in, or is connected to or otherwise associated with optical head 102 for processing data detected by the optical head 102. The computer 26, which includes a processor 27 with memory 28, as well as a user interface including e.g., a display 29 and input devices 30. A non-transitory computer-usable storage medium 42 having computer-readable program code embodied may be used by the computer 26 for causing the processor to control the metrology device 100 and to perform the functions including the analysis described herein. The data structures and software code for automatically implementing one or more acts described in this detailed description can be implemented by one of ordinary skill in the art in light of the present disclosure and stored, e.g., on a computer readable storage medium 42, which may be any device or medium that can store code and/or data for use by a computer system such as processor 27. The computer-usable storage medium 42 may be, but is not limited to, magnetic and optical storage devices such as disk drives, magnetic tape, compact discs, and DVDs (digital versatile discs or digital video discs). A communication port 44 may also be used to receive instructions that are used to program the computer 26 to perform any one or more of the functions described herein and may represent any type of communication connection, such as to the internet or any other computer network. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

Figure 8:
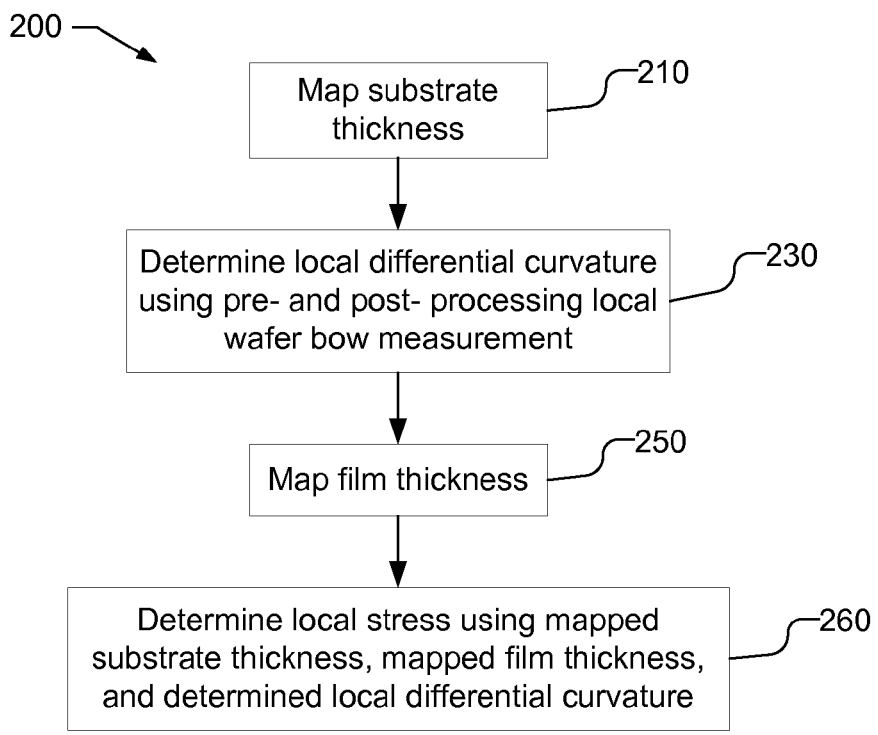
FIG. 8 is a flow chart illustrating a process to determine localized stress in a thin film deposited on substrate by characterizing the substrate warp and bow, substrate thickness variation, and film thickness variation.

FIG. 8 is a flow chart illustrating a process that may be performed by metrology device 100 to determine localized stress in a thin film deposited on substrate 110 by characterizing the substrate warp and bow, substrate thickness variation, and film thickness variation. As illustrated, the substrate thickness is mapped (210), e.g., using the white light interferometer 102. It should be understood that the substrate may include multiple patterned and/or unpatterned films overlying a substrate. The local differential curvature is determined using local substrate warp and bow measurement both before and after processing (230). After processing, the film thickness is mapped (250), e.g., again using the white light interferometer 102. The local stress can then be determined using the mapped substrate thickness, mapped film thickness, and the determined local differential curvature.

Figure 9:
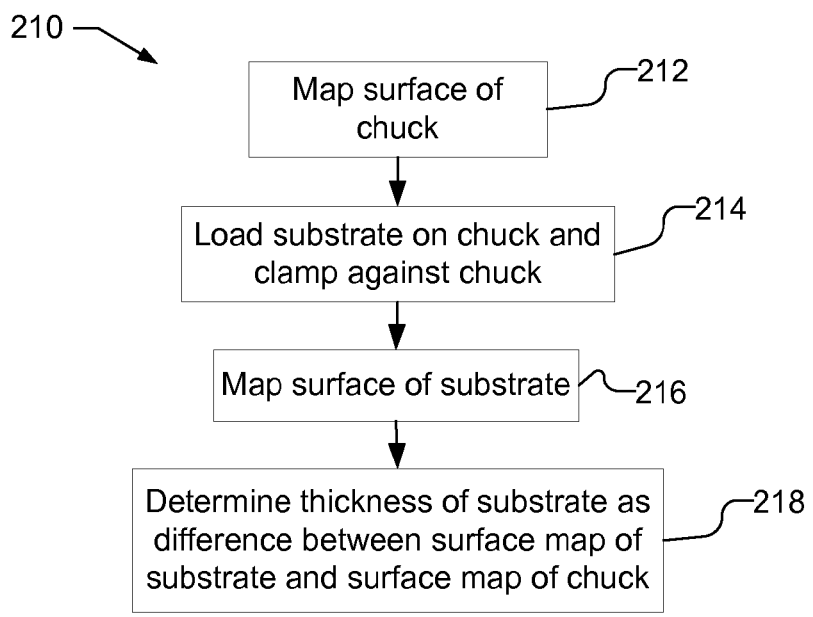
FIG. 9 is a flow chart illustrating the process of mapping the substrate thickness.

FIG. 9 illustrates the process of generating a thickness map of the substrate thickness (210). The surface of the chuck 120 is mapped by the metrology device 100 (212). The substrate 110 is loaded on to the chuck 120 and clamped against the chuck 120, e.g., using vacuum or electostic force (214). The surface of the substrate 110 is then mapped by the metrology device 100 (216). The thickness of the substrate which includes the substrate and any deposited films can then be determined based on the difference between the surface map of the substrate and the surface map of the chuck (218). The resulting map of substrate thickness variation, which consists of the total thickness variation of the substrate and films and any local topography changes, is stored in memory 28 and fed forward into the stress calculation.

Figure 10:
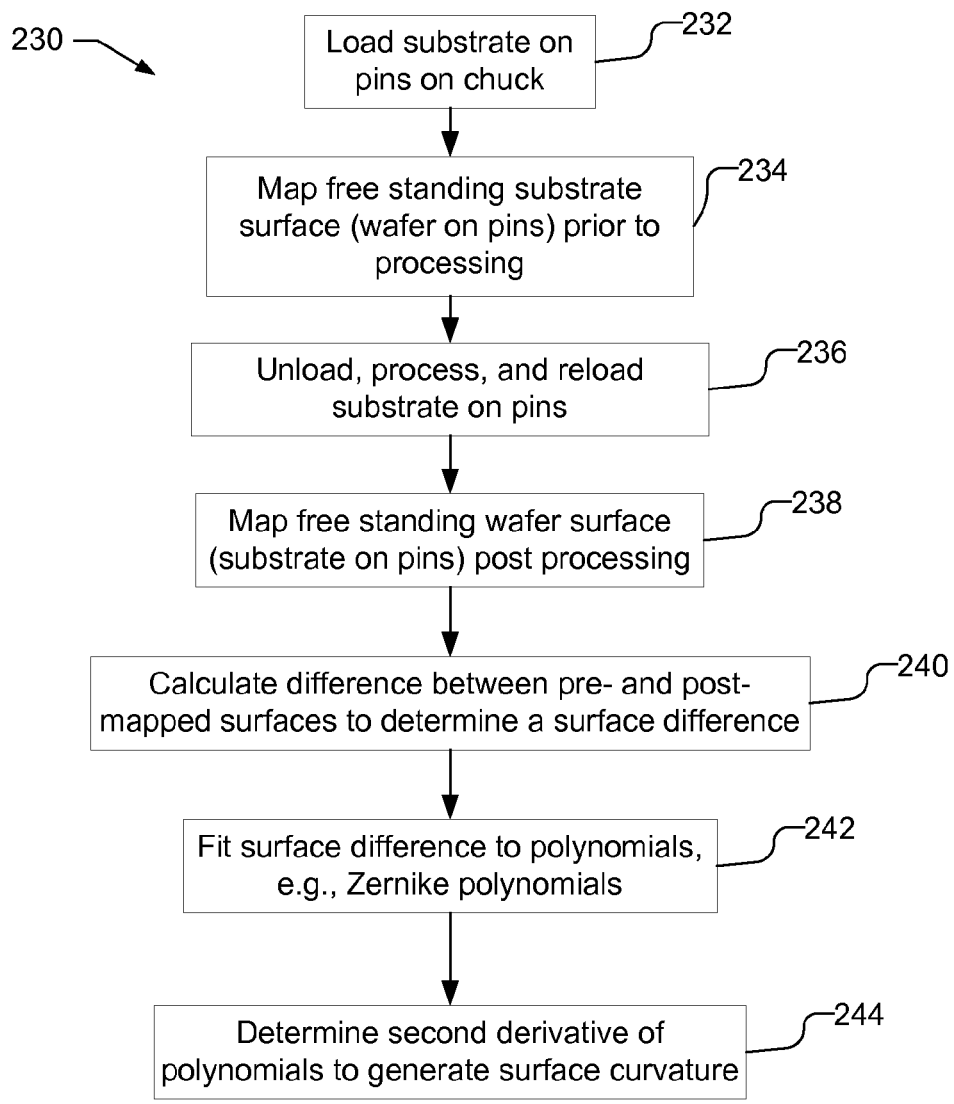
FIG. 10 is a flow chart illustrating determining the local differential curvature, for which the change in the substrate warp and bow due to the processing of the substrate.

FIG. 10 illustrates determining the local differential surface curvature (230), for which the change in the substrate warp and bow due to the processing of the substrate (e.g., deposition of a thin film or CMP (chemical mechanical polishing) process) is measured in a two-step (pre- and post-process) measurement. First, prior to deposition, the substrate 110 is loaded on lift pins 126 on the chuck 120 so that the substrate is allowed to deform under gravity and internal stress (232) and the substrate is mapped while on the lift pins 126 (234). By way of example, the substrate 110 may be loaded on lift pins 126 and mapped prior to or after mapping the thickness of the substrate (210) described above. The scanning white-light interferometer 102 may be used, for example, to map the height of the free standing substrate surface. After mapping the substrate 110 surface, the substrate 110 is loaded, processed, and reloaded on the lift pins 126 of the chuck 120 (236). The substrate 110 is again mapped (238), e.g., using the scanning white-light interferometer 102 to map the height of the free standing substrate surface. The same or different measurements sites measured in the pre-processing mapping may be measured. The difference between the two mapped surfaces is calculated to determine a surface difference (240). The change in the surface curvature is due to the change in the stress. The surface difference is then fit to a set of basis functions (242). By way of example, orthogonal basis functions, which may be polynomials or Fourier components, may be used. In one embodiment, Zernike polynomials of an order consistent with the length scale of the measurements may be used. Zernike polynomials are a set of orthogonal basis functions in cylindrical coordinates, which are well suited to characterizing disc shaped objects. The use of Zernike polynomials to describe the surface profile of substrate 110 is described in "Describing isotropic and anisotropic out-of-plane deformations in thin cubic materials by use of Zernike polynomials", by Chang, Akilian, and Schattenburg, Appl Optics, 45, No. 3, (2006), pp. 432-37, which is incorporated herein by reference. The surface curvature is calculated by determining the second derivative of the basis functions analytically (244). The surface curvature is stored in memory 28 and fed into the stress calculation.

Figure 11:
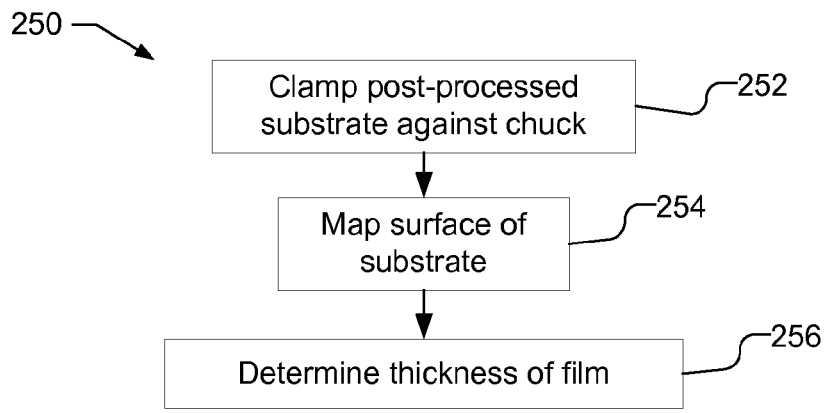
FIG. 11 is a flow chart illustrating the process of mapping the film thickness.

FIG. 11 illustrates the process generating a thickness map of the film (250). It should be understood that the film that is measured is the top film after further processing of the substrate 110, i.e., the film may be a deposited film or the remaining film after a CMP process. The substrate 110 is clamped against the chuck 120, e.g., using vacuum or electrostic force (252). This may be performed immediately before or after post-processing mapping of the free standing substrate surface (238) described above. The surface of the substrate 110 is then mapped by the metrology device 100 (254). The thickness of the film can then be determined (256). By way of example, for thick films, the film thickness may be measured directly using interferometry. Otherwise, the film thickness may be measured using Advanced Film Capability (AFC) analysis of Pupil Plane SWLI (PUPS) measurements as described by Peter J. de Groot and Xavier Colonna de Lega in "Transparent film profiling and analysis by interference microscopy" Interferometry XIV: Applications, Proc. Of SPIE, Vol. 706401, pp 1-6 (2008), and U.S. Pat. Nos. 6,545, 763 and 7,061,623, both of which are incorporated herein by reference. The resulting map of film thickness variation is stored in memory 28 and fed into the stress calculation.

Figure 12:
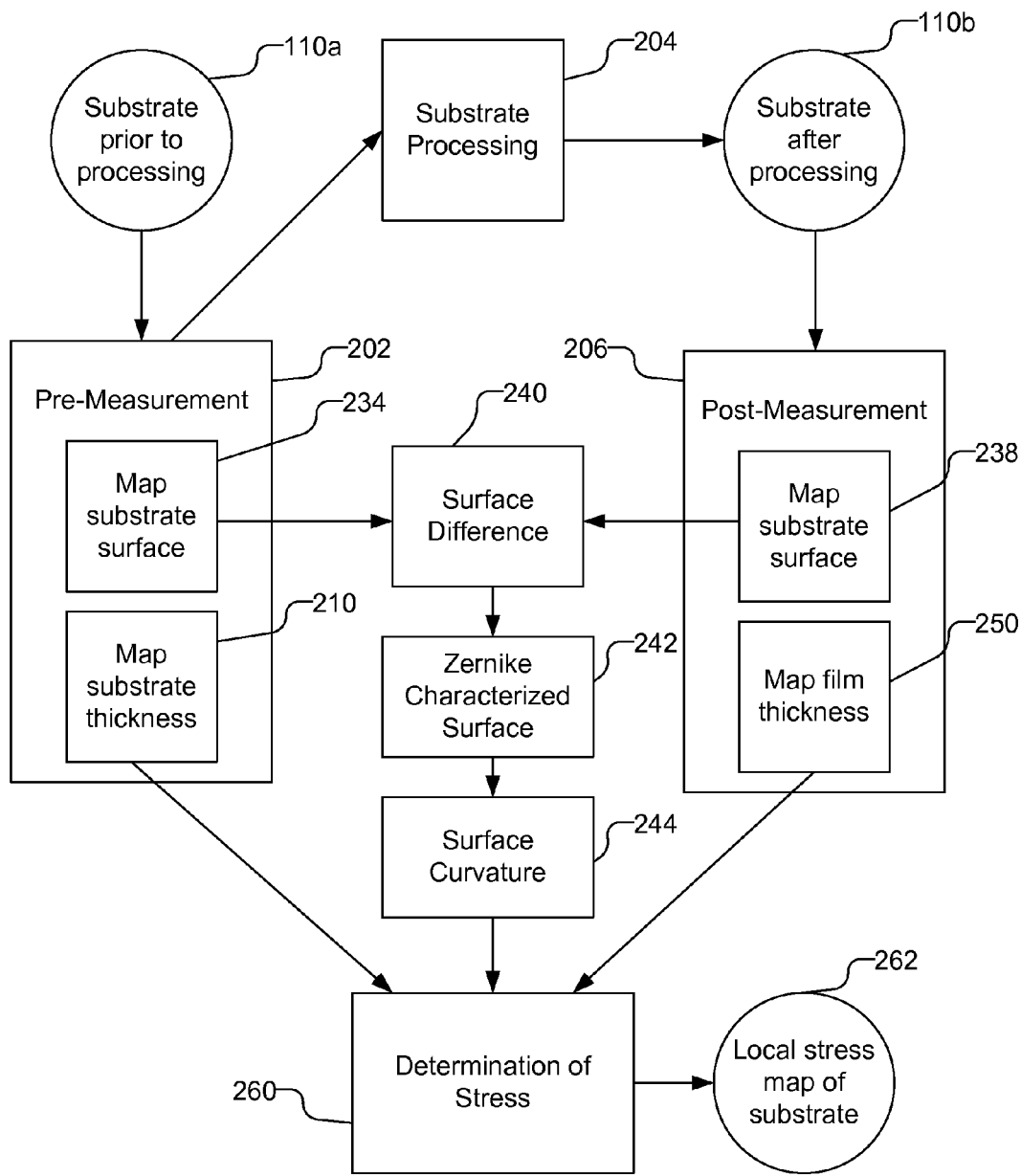
FIG. 12 is an illustration of the process of determining localized stress in a substrate by characterizing the substrate warp and bow, substrate thickness variation, and film thickness variation.

FIG. 12 is an illustration of the process of determining localized stress in a substrate 110 by characterizing the substrate warp and bow, substrate thickness variation, and film thickness variation. The substrate prior to additional processing 110a undergoes pre-measurement 202, which includes mapping the substrate thickness 210, as well as mapping the substrate surface 234. The substrate 110a is removed from the metrology device for pre-measurement 202 and undergoes processing 204, which may be thin film deposition 204 or any other desired processing, such as a CMP process, which may include depositing more than one layer, a lithography process, and etching process followed by polishing the top layer back via CMP. The substrate after processing 110b then undergoes post-measurement 206, which includes mapping the film thickness 250, as well as again mapping the substrate surface 238. The results of the substrate surface mapping from the pre-measurement and post-measurement are combined to determine the surface difference 240. The surface difference 240 is fit to orthogonal basis functions, such as Zernike polynomials 242, and the second derivative of the polynomials is taken to determine the surface curvature 244. The surface curvature 244, along with the mapped substrate thickness 234 and the mapped film thickness 250 are fed into the stress calculation 260, from which a local stress map of the substrate 262 is generated and which is stored in memory 28 and may be displayed or otherwise provided to the user.

In one embodiment, a single optical tool, such as white light interferometer 102 is used to perform the pre-measurement 202 and post-measurement 206, which increases throughput as well as reduces cost of the device.

The stress calculation 260 is determined based on the surface curvature, the substrate thickness, and the film thickness. When the stress, substrate, and film are uniform and isotropic, the curvature is also uniform and isotropic and stress σ may be characterized by Stoney's Equation:

$$\sigma = \frac{Eh_s^2}{6h_f(1-\nu_s)}\kappa \qquad \text{eq. 1}$$

where E is the Young's modulus of the substrate, $h_s$ is the thickness of the substrate, $h_f$ is the thickness of the film, $\nu_s$ is the Poisson's ratio of the substrate, and κ is the curvature.

When the stress, substrate, and film are non-uniform or not isotropic, however, the stress will not be related to the curvature through the simple Stoney's Equation, and, thus, Stoney's Equation cannot be applied to calculate local stress from measurements of local curvature. Accordingly, Stoney's Equation is modified with corrections for non-uniform substrate thickness, non-uniform film thickness, and non-uniform curvature. Information regarding Stoney's Equation is provided in D. Ngo, Y. Huang, A. J. Rosakis and X. Feng, "Spatially non-uniform, isotropic misfit strain in thin films bonded on plate substrates: the relation between non-uniform stresses and system curvatures", Thin Solid Films 515 (2006), pp. 2220-2229; and D. Ngo, X. Feng, Y. Huang, A. J. Rosakis and M. A. Brown, "Thin film/substrate systems featuring arbitrary film thickness and misfit strain distributions: Part I. Analysis for obtaining film stress from nonlocal curvature information", Int. J. Solids Struct. 44 (2007), pp. 1745-1754, both of which are incorporated herein by reference.

$$\sigma_+ = \frac{Eh_s^2}{6h_f(1-\nu_s)}[\kappa_+ + s_o + s_p] \qquad \text{eq. 2}$$

$$\sigma_+ = \sigma_{\theta\theta} + \sigma_{rr}; \qquad \text{eq. 3}$$
$\sigma_{\theta\theta}$ = stress in angular direction
$\sigma_{rr}$ = stress in radial direction $$\kappa_+ = \kappa_{\theta\theta} + \kappa_{rr}; \qquad \text{eq. 4}$$
$\kappa_{\theta\theta}$ = curvature in angular direction
$\kappa_{rr}$ = curvature in radial direction $s_o$ = first correction term  eq. 5
$s_p$ = additional correction terms $$s_o = \frac{(1-\nu)}{(1+\nu)}(\kappa_+ - \bar{\kappa}_+); \qquad \text{eqs. 6}$$

$\bar{\kappa}_+$ = average $\kappa_+$ across the wafer

A surfaced characterized by Zernike functions may be written:

$$z(r,\theta) = \sum_{n,m} a_{n,m} Z_n^m; \qquad \text{eqs. 7}$$

$z$ = water surface position;

$Z_n^m$ = Zernike polynomial;

$a_{n,m}$ = fit coefficients

The curvature can be written as:

$$\kappa_{rr} = \frac{\partial^2}{\partial r^2} z(r,\theta); \qquad \text{eqs. 8}$$

$$\kappa_{rr} = \sum_{n,m} a_{n,m} \frac{\partial^2}{\partial r^2} Z_n^m$$

$$\kappa_{\theta\theta} = \frac{1}{r}\frac{\partial}{\partial r} z(r,\theta) + \frac{1}{r^2}\frac{\partial^2}{\partial \theta^2} z(r,\theta) \qquad \text{eqs. 9}$$

$$\kappa_{\theta\theta} = \frac{1}{r}\sum_{n,m} a_{n,m}\frac{\partial}{\partial r}Z_n^m + \frac{1}{r^2}\sum_{n,m} a_{n,m}\frac{\partial^2}{\partial\theta^2}Z_n^m.$$

Accordingly, the first correction term may be written as:

$$s_o = \frac{(1-\upsilon)}{(1+\upsilon)} \qquad \text{eq. 10}$$

$$\left[\kappa_+ - \frac{1}{\pi}\sum_{n,m} a_{n,m} \int\int \left(\frac{\partial^2}{\partial r^2}Z_n^m + \frac{1}{r}\frac{\partial}{\partial r}Z_n^m + \frac{1}{r^2}\frac{\partial^2}{\partial\theta^2}Z_n^m\right) dA\right]$$

The additional correction terms may be written as:

$$s_p = \frac{(1-\upsilon)}{(1+\upsilon)}\sum_k (k+1)r^k[A_k\cos k\theta + B_k\sin k\theta]; \qquad \text{eq. 11}$$

$$A_k = \frac{1}{\pi}\int\int_A \kappa_+ r^k \cos k\theta \, dA; \qquad \text{eq. 12}$$

$$A_k = \frac{1}{\pi}\sum_{n,k} a_{n,k}\int\int_A\left(\frac{\partial^2}{\partial r^2}Z_n^k + \frac{1}{r}\frac{\partial}{\partial r}Z_n^k + \frac{1}{r^2}\frac{\partial^2}{\partial\theta^2}Z_n^k\right)r^k \cos k\theta \, dA; \qquad \text{eq. 13}$$

$$B_k = \frac{1}{\pi}\sum_{n,k} a_{n,k}\int\int_A\left(\frac{\partial^2}{\partial r^2}Z_n^k + \frac{1}{r}\frac{\partial}{\partial r}Z_n^k + \frac{1}{r^2}\frac{\partial^2}{\partial\theta^2}Z_n^k\right)r^k \sin k\theta \, dA. \qquad \text{eq. 14}$$

Advantageously, the fit coefficients $\alpha_{n,m}$ are outside the integrals in equations 10, 13, and 14. Thus, the Zernike polynomials $Z_n^k$ can be integrated once prior to measurement and those values are saved and used as a multiple for the fit coefficients $\alpha_{n,m}$ once determined for an individual substrate. Accordingly, only the summations need be performed in the calculations, which increases speed compared to performing the integrations, as well as removes concerns about sparse data or boundaries in the integration.

To correct for varying film thickness, the actual film thickness $h_f(r,\theta)$ is substituted in for each point of interest as follows:

$$\sigma_+ = \frac{Eh_s^2}{6(1-\upsilon_s)h_f(r,\theta)}[\kappa_+ + s_o + s_p] \qquad \text{eq. 15}$$

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of determining a local stress in a film on a substrate, the method comprising:
   generating a thickness map of the substrate prior to processing of the substrate;
   determining a surface curvature of the substrate caused by the processing;
   generating a thickness map of the film on a top surface of the substrate after processing; and
   determining the local stress in the film using the thickness map of the substrate, the surface curvature, and the thickness map of the film.

2. The method of claim 1, wherein processing the substrate is one or more of the following: depositing the film on the substrate and performing chemical mechanical polishing on the substrate.

3. The method of claim 1, wherein generating the thickness map of the substrate, determining surface curvature, and generating the thickness map of the film is performed using a single optical metrology device.

4. The method of claim 3, wherein the single optical metrology device is a scanning white light interferometer.

5. The method of claim 1, wherein the surface curvature of the substrate is determined as orthogonal basis functions and wherein determining the local stress uses the surface curvature determined as the orthogonal basis functions.

6. The method of claim 5, wherein the orthogonal basis functions are Zernike polynomials.

7. The method of claim 1, wherein generating the thickness map of the substrate comprises:
   generating a surface map of a chuck that holds the substrate;
   loading and clamping the substrate on the chuck;
   generating a top surface map of the substrate; and
   generating the thickness map of the substrate based on a difference between the top surface map of the substrate and the surface map of the chuck.

8. The method of claim 1, wherein determining the surface curvature comprises:
   measuring a first bowing of the substrate prior to processing;
   measuring a second bowing of the substrate after processing; and
   determining the surface curvature using the first bowing measurement and the second bowing measurement.

9. The method of claim 8, wherein determining surface curvature using the first bowing measurement and the second bowing measurement comprises:
   calculating a difference between the first bowing and the second bowing to determine a surface difference;
   fitting the surface difference to basis functions; and
   determining a second derivative of the basis functions to generate the surface curvature.

10. The method of claim 9, wherein the basis functions are Zernike polynomials.

11. The method of claim 1, wherein determining the local stress in the film comprises using Stoney's equation that is corrected for non-uniform substrate curvature, non-uniform film thickness, and non-uniform substrate thickness.

12. An apparatus for determining local stress in a film on a substrate, the apparatus comprising:
a single optical metrology head comprising a radiation source for producing radiation to be incident on the substrate and a detector for detecting the radiation after the radiation interacts with the substrate; and
a computer coupled to receive signals from the detector and a computer-usable medium having computer-readable program code embodied therein for causing said computer to:
generate a thickness map of the substrate prior to processing of the substrate;
determine a surface curvature of the substrate caused by the processing;
generate a thickness map of the film on a top surface of the substrate after processing; and
determine the local stress in the film using the thickness map of the substrate, the surface curvature, and thickness map of the film.

13. The apparatus of claim 12, wherein processing the substrate is one or more of the following: depositing the film on the substrate and performing chemical mechanical polishing on the substrate.

14. The apparatus of claim 12, wherein the single optical metrology head is a scanning white light interferometer.

15. The apparatus of claim 12, wherein the surface curvature of the substrate is determined as basis functions and wherein determining the local stress uses the surface curvature determined as the basis functions.

16. The apparatus of claim 15, wherein the basis functions are Zernike polynomials.

17. The apparatus of claim 12, wherein the apparatus further comprises a chuck, and wherein the computer-readable program code causes the computer to generate the thickness map of the substrate by causing the computer to:
generate a surface map of the chuck that holds the substrate;
generate a top surface map of the substrate; and
generate the thickness map of the substrate based on a difference between the top surface map of the substrate and the surface map of the chuck.

18. The apparatus of claim 12, wherein the computer-readable program code causes the computer to determine the surface curvature by causing the computer to:
measure a first bowing of the substrate prior to processing;
measure a second bowing of the substrate after processing; and
determine the surface curvature using the first bowing measurement and the second bowing measurement.

19. The apparatus of claim 18, wherein the computer-readable program code causes the computer to determining surface curvature using the first bowing measurement and the second bowing measurement by causing the computer to:
calculate a difference between the first bowing and the second bowing to determine a surface difference;
fit the surface difference to basis functions; and
determine a second derivative of the basis functions to generate the surface curvature.

20. The apparatus of claim 19, wherein the basis functions are Zernike polynomials.

21. The apparatus of claim 12, wherein the computer-readable program code causes the computer to determine the local stress in the film by causing the computer to use Stoney's equation that is corrected for non-uniform substrate curvature, non-uniform film thickness, and non-uniform substrate thickness.

22. An apparatus for determining local stress in a film on a substrate, the apparatus comprising:
a radiation source for producing radiation to be incident on the substrate;
a detector for detecting the radiation after the radiation interacts with the substrate; and
a computer coupled to receive signals from the detector and a computer-usable medium having computer-readable program code embodied therein for causing said computer to:
generate a thickness map of the substrate prior to processing of the substrate;
determine surface curvature of the substrate caused by the processing, wherein the surface curvature of the substrate is determined as basis functions;
generate a thickness map of the film on a top surface of the substrate after processing; and
determine the local stress in the film using the thickness map of the substrate, the surface curvature determined as the basis functions, and the thickness map of the film.

23. The apparatus of claim 22, wherein processing the substrate is one or more of the following: depositing the film on the substrate and performing chemical mechanical polishing on the substrate.

24. The apparatus of claim 22, wherein the radiation source and the detector are in a scanning white light interferometer.

25. The apparatus of claim 22, wherein the basis functions are Zernike polynomials.

26. The apparatus of claim 22, wherein the apparatus further comprises a chuck, and wherein the computer-readable program code causes the computer to generate the thickness map of the substrate by causing the computer to:
generate a surface map of the chuck that holds the substrate;
generate a top surface map of the substrate; and
generate the thickness map of the substrate based on a difference between the top surface map of the substrate and the surface map of the chuck.

27. The apparatus of claim 22, wherein the computer-readable program code causes the computer to determine the surface curvature by causing the computer to:
measure a first bowing of the substrate prior to processing;
measure a second bowing of the substrate after processing; and
determine the surface curvature using the first bowing measurement and the second bowing measurement.

28. The apparatus of claim 27, wherein the computer-readable program code causes the computer to determining surface curvature using the first bowing measurement and the second bowing measurement by causing the computer to:
calculate a difference between the first bowing and the second bowing to determine a surface difference;
fit the surface difference to basis functions; and
determine a second derivative of the basis functions to generate the surface curvature.

29. The apparatus of claim 22, wherein the computer-readable program code causes the computer to determine the local stress in the film by causing the computer to use Stoney's equation that is corrected for non-uniform substrate curvature, non-uniform film thickness, and non-uniform substrate thickness.

30. An apparatus for determining local stress in a film on a substrate, the apparatus comprising:
- a radiation source for producing radiation to be incident on the substrate;
- a detector for detecting the radiation after the radiation interacts with the substrate; and
- a computer coupled to receive signals from the detector and a computer-usable medium having computer-readable program code embodied therein for causing said computer to:
- generate a thickness map of the substrate prior to processing of the substrate, the substrate having non-uniform thickness;
- determine a surface curvature of the substrate caused by the processing, the surface curvature being non-uniform;
- generate a thickness map of the film on a top surface of the substrate after processing, the film having non-uniform film thickness; and
- determine the local stress in the film using the thickness map of the substrate, the surface curvature, and thickness map of the film and using Stoney's equation that is corrected for non-uniform substrate curvature, non-uniform film thickness, and non-uniform substrate thickness.

31. The apparatus of claim 30, wherein processing the substrate is one or more of the following: depositing the film on the substrate and performing chemical mechanical polishing on the substrate.

32. The apparatus of claim 30, wherein the radiation source and the detector are in a scanning white light interferometer.

33. The apparatus of claim 30, wherein the surface curvature of the substrate is determined as basis functions and wherein determining the local stress uses the surface curvature determined as the basis functions.

34. The apparatus of claim 33, wherein the basis functions are Zernike polynomials.

35. The apparatus of claim 30, wherein the apparatus further comprises a chuck, and wherein the computer-readable program code causes the computer to generate the thickness map of the substrate by causing the computer to:
- generate a surface map of the chuck that holds the substrate;
- generate a top surface map of the substrate; and
- generate the thickness map of the substrate based on the difference between the top surface map of the substrate and the surface map of the chuck.

36. The apparatus of claim 30, wherein the computer-readable program code causes the computer to determine the surface curvature by causing the computer to:
- measure a first bowing of the substrate prior to processing;
- measure a second bowing of the substrate after processing; and
- determine the surface curvature using the first bowing measurement and the second bowing measurement.

37. The apparatus of claim 36, wherein the computer-readable program code causes the computer to determining surface curvature using the first bowing measurement and the second bowing measurement by causing the computer to:
- calculate a difference between the first bowing and the second bowing to determine a surface difference;
- fit the surface difference to basis functions; and
- determine a second derivative of the basis functions to generate the surface curvature.

38. The apparatus of claim 37, wherein the basis functions are Zernike polynomials.

* * * * *